(12) United States Patent
Mahmood (10) Patent No.: US 8,321,104 B2
(45) Date of Patent: Nov. 27, 2012

(54) CONTROL SYSTEM (75) Inventor: Shahid Mahmood, Derby (GB)

(73) Assignee: Rolls-Royce PLC, London (GB)

( * ) Notice: Subject to any disclaimer, the term of this patent is extended or adjusted under 35 U.S.C. 154(b) by 623 days.

(21) Appl. No.: 12/457,833

(22) Filed: Jun. 23, 2009

(65) Prior Publication Data

US 2010/0017093 A1 Jan. 21, 2010

(30) Foreign Application Priority Data

Jul. 18, 2008 (GB) .................................. 0813263.1
Jan. 14, 2009 (GB) .................................. 0900574.5

(51) Int. Cl.
*G06F 19/00* (2006.01)
(52) U.S. Cl. ............................. 701/60; 701/58; 701/100
(58) Field of Classification Search .................. 701/100, 701/42; 60/172, 186; 700/29, 32, 37, 3; 714/25, 34; 454/256, 258; 123/406.24
See application file for complete search history.

(56) References Cited

U.S. PATENT DOCUMENTS

| | | | |
|---|---|---|---|
| 4,694,188 A | | 9/1987 | Diegel et al. |
| 4,993,221 A | * | 2/1991 | Idelchik .......................... 60/773 |
| 5,023,793 A | * | 6/1991 | Schneider et al. ............ 701/100 |
| 5,048,288 A | | 9/1991 | Bessette et al. |
| 5,083,277 A | | 1/1992 | Shutler |
| 5,303,142 A | | 4/1994 | Parsons et al. |
| 6,119,446 A | | 9/2000 | Shon |
| 6,487,491 B1 | | 11/2002 | Karpman et al. |
| 7,111,464 B2 | | 9/2006 | Rowe |
| 7,750,733 B2 | * | 7/2010 | Sorrells et al. ............ 330/124 R |
| 7,835,709 B2 | * | 11/2010 | Sorrells et al. ............. 455/127.3 |
| 8,027,742 B2 | * | 9/2011 | Seem et al. ...................... 700/38 |
| 8,042,352 B2 | * | 10/2011 | Deangelis ....................... 62/260 |

(Continued)

FOREIGN PATENT DOCUMENTS

GB 2 226 430 A 6/1990

OTHER PUBLICATIONS

Integration of 1D and 3D Simulations of Engine Cooling System: After Keyed-Off;Pang, S.C. et al.; Distributed Computing and Applications to Business, Engineering and Science (DCABES), 2011 Tenth International Symposium on; Digital Object Identifier: 10.1109/DCABES.2011.53; Publication Year: 2011 , pp. 46-50.*

(Continued)

*Primary Examiner* — Cuong H Nguyen
(74) *Attorney, Agent, or Firm* — Oliff & Berridge, PLC (57) ABSTRACT

A control system provides an aggregate driven quantity demand signal for controlling an actuatable component. The system has a summing junction which generates the aggregate driven quantity demand signal by summing a first output signal, which converges on a steady state driven quantity requirement value, and a change in driven quantity demand signal. The system further has a feedback loop which generates the first output signal in response to the aggregate driven quantity demand signal. The system also has a first variable gain which tunes the change in driven quantity demand signal in response to a reference demand signal. The feedback loop includes a second variable gain which tunes the rate at which the first output signal converges on the steady state driven quantity requirement value. Typically, the reference demand signal corresponds to a desired value or desired change in value of a parameter which is itself varied or controlled by actuation of the actuatable component.

19 Claims, 8 Drawing Sheets

U.S. PATENT DOCUMENTS 8,096,140 B2 * 1/2012 Seem .............................. 62/186
2004/0240988 A1 12/2004 Franconi et al.
2006/0090467 A1 * 5/2006 Crow .............................. 60/645

OTHER PUBLICATIONS

Cooling airflow in unidirectional ventilated open-type motor for electric vehicles; Nakahama, T. et al..; Energy Conversion, IEEE Transactions on; Volume: 21, Issue: 3; Digital Object Identifier: 10.1109/TEC.2006.877364; Publication Year: 2006, pp. 645-651.*

Thermal management technology for series-parallel HEV; Sun Xiaoxia; Wang Yichun; Wang Facheng; Mechatronics and Automation (ICMA), 2010 International Conference on; Digital Object Identifier: 10.1109/ICMA.2010.5589078 Publication Year: 2010, pp. 213-218.*

Assessment of advanced thermal management systems for micro-hybrid trucks and heavy duty diesel vehicles; Staunton, N.; Pickert, V.; Maughan, R.; Vehicle Power and Propulsion Conference, 2008. VPPC '08. IEEE; Digital Object Identifier: 10.1109/VPPC.2008.4677464; Publication Year: 2008, pp. 1-6.*

* cited by examiner

CONTROL SYSTEM

FIELD OF THE INVENTION

The present invention relates to control systems, such as engine fuel control systems or engine-casing cooling air control systems, particularly for gas turbine engines.

BACKGROUND OF THE INVENTION

A purpose of an engine fuel control system is to provide an engine with fuel in a form suitable for combustion and to control the rate of fuel flow for accurate control of engine speed and acceleration. It is known to control the thrust of a gas turbine engine using an Electronic Engine Control (EEC), the thrust of the engine being indirectly measured using shaft speed, Engine Pressure Ratio (EPR) or Turbine Power Ratio (TPR). The EEC also controls (i) the shaft speeds within safe operational limits, and (ii) the temperature and pressure at different parts of the engine to avoid undesirable conditions such as surge or stall, and to ensure the integrity of the engine. Environmental considerations as well as growing power demands of modern aircraft require control systems that are robust and optimised to the operating conditions of the aircraft.

Electronic closed-loop fuel control systems have an integrating action which helps to ensure accurate control of the engine while meeting the pilot's demands for thrust and complying with safety limits. Such systems offer distinct advantages in the achievement of accurate Ndot control under normal operating conditions.

U.S. Pat. No. 5,083,277, which is hereby incorporated by reference, discloses an engine fuel control system in which fuel flow to the engine is controlled by a fuel flow metering valve in response to an aggregate fuel flow demand signal. This signal comprises an element computed in accordance with instantaneous engine speed and an overfuelling element computed in accordance with a pilot's thrust or speed demand.

Figure 1:
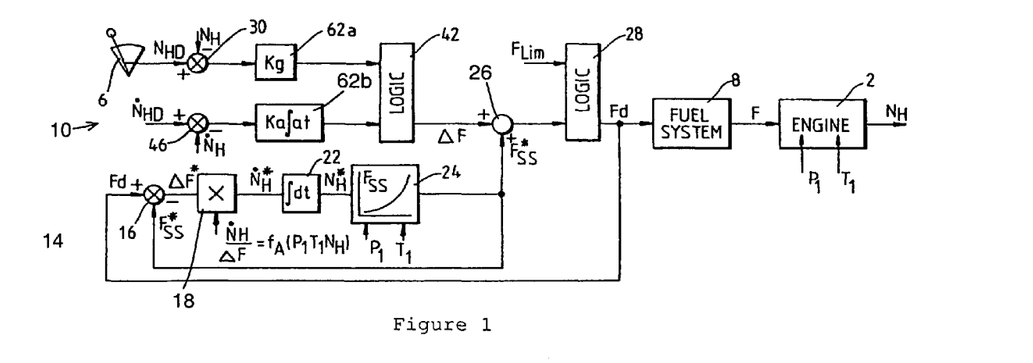
FIG. 1 shows an engine fuel control system of the type described in U.S. Pat. No. 5,083,277.

FIG. 1 shows in more detail an engine fuel control system of the type described in U.S. Pat. No. 5,083,277.

The system of FIG. 1 employs a selector control system, generally indicated at 10 with two competing control loops. The first includes the pilot's engine speed demand lever and signal generator 6 (which provides a demanded high pressure shaft speed signal $NH_D$), engine shaft speed error circuit 30, and gain 62a. The second loop, constituting a shaft acceleration controller, comprises an acceleration limiter loop comparator 46, and an integrator 62b. The high pressure shaft speed signal NH is fedback from the engine to the speed governor loop comparator 30 directly and to the acceleration limiter loop comparator 46 via a differentiator (not shown). Selection of one or the other of these control loops is made on the basis of the lowest fuel flow requirement wins by logic block 42 to provide an overfuelling requirement $\Delta F$. Gain 62a and integrator 62b have respective variable gains Kg and Ka, which are used to map from loop error to $\Delta F$.

For the sake of brevity, a deceleration limiter control loop has been omitted from the drawings of FIG. 1. In practice, a deceleration limiter loop would be very much like the acceleration limiter loop, but would use a negative reference signal, and its output would be compared with the output of the NH governor loop on the basis of the highest fuel flow requirement wins. The result of that comparison being carried forward to the lowest wins logic 42.

An estimated engine steady state fuel flow requirement Fss* is computed by engine model block 24 of the feedback loop generally indicated at 14, and this signal is arithmetically summed to the overfuelling requirement $\Delta F$ selected by logic 42 at summing junction 26. The aggregate fuel flow demand signal is supplied to one input of a lowest wins logic block 28 for comparison with a maximum fuel flow signal $F_{Lim}$. A further minimum fuel flow limit signal is compared with the output of block 28 by a highest wins comparison but this is omitted from FIG. 1. The resulting trimmed aggregate fuel flow demand signal Fd is connected to control operation of the fuel system 8 which regulates the flow of fuel to engine 2.

Steady state fuel flow control of the engine is provided by the estimate of the engine steady state fuel flow requirement Fss* against the chosen spool speed, i.e. NH, computed by feedback loop 14. The input to feedback loop 14 is the trimmed aggregate fuel flow demand signal Fd. At summing junction 16 the loop output signal, i.e. an estimated steady state fuel flow signal Fss*, is subtracted from Fd. The difference is the modelled overfuelling demand $\Delta F^*$, including any limitations imposed by external factors at e.g. logic circuit 28. $\Delta F^*$ is multiplied at 18 by the rate of change of engine speed with fuel flow increment NHdot/$\Delta F$ to provide an estimate of engine acceleration Nhdot*.

The estimated acceleration NHdot* is integrated by integrator 22 to obtain an estimated engine shaft speed NH* from which the estimated steady state fuel flow requirement Fss* is computed by engine model block 24. Additional signals $P_1$, $T_1$ (inlet pressure and temperature) are shown as inputs to block 24. These signals modify the formula used to compute the Fss* versus NH* characteristic or, alternatively, to select the most appropriate member of a family of such characteristics in accordance with prevailing conditions represented by the inputs.

The computed relationship provided by block 24 is matched as accurately as possible to actual engine behaviour. Thus, there may be further inputs to the block for variable parameters affecting engine performance such as mechanical power offtake, compressor air bleed level, inlet guide vane angle etc., the effect of which must be mirrored in the computed relationship.

Although engine fuel control systems of the type described in U.S. Pat. No. 5,083,277 enable the use of a simple fuel metering valve and can provide accurate control of engine speed and acceleration, under some circumstances, particularly when applied to high bypass ratio turbofans, inadequate control loop stability, in particular phase margins, can result for certain loops when these are tuned to fulfil desired bandwidth requirements.

As well as engine fuel control systems, other types of control system are found in gas turbine engines. For example, engine-casing cooling air control systems allow the clearance between the casing and the blade tips of a turbine of the engine to be adjusted, thereby reducing leakage of working fluid between the casing and the tips, and improving engine efficiency.

Substantial performance degradation is caused by the leakage of working fluid between the rotor and stator assemblies of an engine. A significant part of the leakage is attributed to the radial clearance between the casing and the blades tips of a turbine, generally known as turbine tip clearance. However, while it is desired to reduce turbine tip clearance, some clearance is required to accommodate differential thermal expansion between the rotor and stator assemblies.

At cross-sections along the axis of a turbine, the turbine casing forms a circle surrounding the tips of rotor blades. The blades are in intimate contact with the processed fluid and respond rapidly to variations in working medium temperature. The casing is located at the boundary of the gas path and responds more slowly to changes in operating conditions. The casing is, conventionally, segmented to prevent the build up of mechanical stresses within the turbine casing. As the engine is accelerated during operation, the rotor assemblies grow radially outward toward the casing. A substantial initial clearance is provided between the turbine seal formed on the radially inner wall of the casing and the blade tips to permit this radially outward growth and to allow turbine operation to be free of rub. The minimum clearance between the blade tips and the casing generally occurs during transient operating phases, such as takeoff and acceleration. At equilibrium conditions, however, the clearance tends to increase and excessive leakage of working fluid can occur through the gaps between rotor and stator assemblies.

The radial clearance between the rotor and stator assemblies at cruise conditions can be reduced through the application of turbine casing cooling systems. As the casing is cooled it shrinks, thereby reducing tip clearance to a more acceptable level.

U.S. Pat. No. 5,048,288 discloses a turbine tip clearance control arrangement in which the outer air seal of a gas turbine engine is continuously cooled by compressor discharge air and by a by-pass line which can be throttled or shut off. US patent application no. 2004/0240988 discloses a valve assembly for a turbofan jet for supplying cooling air to turbine case sections.

U.S. Pat. No. 6,487,491 proposes closed-loop tip clearance control, in which case the tip clearance of the engine is monitored during flight, including take off and landing, and adjusted by controlling air flow adjacent the engine casing in response to thermal growth.

Although turbine casing cooling holds considerable promise for improved engine performance, that promise has not yet been fully realised in practice.

SUMMARY OF THE INVENTION

In general terms, the present invention provides a control system which provides an aggregate driven quantity demand signal (such as an aggregate fuel flow demand signal, or an aggregate valve position demand signal) for controlling an actuatable component (such as a valve which regulates fuel flow, or a valve which regulates a cooling air flow). Generally, the system receives a reference demand signal (such as thrust or speed demand signal, or a cooling air flow demand signal), which is used by the system to generate the aggregate driven quantity demand signal. Typically, the reference demand signal corresponds to a desired value or desired change in value of a parameter which is itself varied or controlled by actuation of the actuatable component.

In a first aspect, the present invention provides an engine fuel control system which provides an aggregate fuel flow demand signal for controlling a fuel flow metering valve which regulates fuel flow to the engine (typically a gas turbine engine), the system having:
 a summing junction which generates the aggregate fuel flow demand signal by summing a first output signal which converges on a steady state fuel flow requirement value and an overfuelling demand signal,
 a feedback loop which generates the first output signal in response to the aggregate fuel flow demand signal, and
 a selector control system which generates the overfuelling demand signal in response to a thrust or speed demand signal;
wherein the selector control system includes a first variable gain which tunes the overfuelling demand signal, and the feedback loop includes a second variable gain which tunes the rate at which the first output signal converges on the steady state fuel flow requirement value.

Thus, relative to the system described above in relation to FIG. 1, the engine fuel control system of this aspect of the invention has a first output signal generated by the feedback loop which converges on a steady state fuel flow requirement value, and a second variable gain included in the feedback loop which tunes the rate of convergence to the steady state fuel flow requirement value.

This arrangement allows the second variable gain to modify the characteristics of the feedback loop such that phase margins can be improved, engine output overshoots can be reduced, and accurate control of engine speed and acceleration can be achieved, without compromising the bandwidth of the control system. Whilst the engine fuel control system described in U.S. Pat. No. 5,083,277 is focussed on adequate control of NH and NHdot signals and hence compromises on, for example, the performance of intermediate pressure shaft speed (NI) and low pressure shaft speed (NL), the present invention can provide adequate control of all engine outputs, including NI, NL and even modelled/mixed signals NMix and NMixdot disclosed in U.S. Pat. No. 7,111,464.

The aggregate fuel flow demand signal, in response to which the feedback loop generates the first output signal, is typically the signal generated by the summing junction. Optionally, however, the signal generated by the summing junction may be modified by external factors (such as logic circuits which compare the signal with maximum and minimum fuel flow signals) to provide an actual aggregate fuel flow demand signal in response to which the feedback loop generates the output signal.

Preferably the feedback loop includes an engine model. The engine model may have an inverse static process module which determines steady state fuel flow requirement as a function of steady state engine speed. Thus the feedback loop can mimic accurately the steady state response of the actual engine. The model can account for the effect of external factors, such as altitude, Mach number, guide vane and air bleed settings and power offtake on the characteristics of the engine. Advantageously, the second variable gain can be used to compensate for modelling inaccuracies in the engine model.

Typically the feedback loop includes an integrator which, preliminary to the generation of the first output signal by the feedback loop, integrates an estimate of the engine's acceleration to provide an estimate of the engine's speed, i.e. typically the speed of a shaft of the engine. The estimate of the engine's speed can be used as an input to the engine model. The second variable gain can be viewed as, in effect, modifying the integral time of the integrator.

This modification may be targeted at compensating for inaccuracies in an engine model included in the feedback loop, thus generating a more accurate model of the engine dynamics. The integral gain can also be used to alter the engine model dynamics so that, for example, the modelled engine speed leads or lags behind the actual engine speed during transients. Thus, whereas in the prior art control system of FIG. 1, the integration time strictly follows the time constant of the engine, the integration time of the control system of the present invention can be set as a multiple or fraction of the time constant of the engine.

Typically, the second variable gain varies as a function of a modelled or actual engine output, such as engine speed. For example, it may be a function of an estimate of the engine's speed or a function of a measured speed of the engine.

The feedback loop may receive a second output signal which converges on a value of the rate of change of engine speed with fuel flow increment, the feedback loop combining the second output signal with the aggregate fuel flow demand signal to provide the estimated engine acceleration; and the feedback loop may have a subsidiary loop which generates the second output signal in response to the estimate of the engine's speed, the second variable gain also tuning the rate at which the second output signal converges on the rate of change of engine speed with fuel flow increment.

For example, the first output signal (which converges on the steady state fuel requirement value) may be subtracted from the aggregate fuel demand signal (e.g. at a further summing junction) to provide an overfuelling demand which is then multiplied with the second output signal to provide the estimated engine acceleration.

When the feedback loop includes an engine model, preferably the engine model has a transient-engine module in the subsidiary loop which determines rate of change of engine speed with fuel flow increment as a function of engine speed.

The second variable gain can act on the second output signal generated by the subsidiary loop before the second output signal is combined with the aggregate fuel demand signal. For example, when the subsidiary loop has a transient-engine module, the second variable gain can act on the rate of change of engine speed with fuel flow increment determined by the transient-engine module.

In other embodiments, when the feedback loop includes an engine model having an inverse static process module, the second variable gain can act on the steady state fuel flow requirement determined by the inverse static process module to modulate the value of the first output signal.

When the feedback loop includes an integrator, the second variable gain can act on the estimated engine acceleration before it enters the integrator. In other embodiments, the second variable gain can act on the estimated engine speed after it is provided by the integrator. This allows, for example, a scaled engine speed to be applied to an engine model module.

These different options for the location in the feedback loop where the second variable gain acts will typically have different control system response sensitivities to variations in the second variable gain, which can be a basis for selecting one option over the other.

Elements of the engine fuel control system (such as the summing junction, feedback loop, selector control system) may be implemented by one or more suitably configured processors and typically also one or more memory devices.

Preferably, the control system further has a fuel flow metering valve which is controlled by the aggregate fuel flow demand signal. The valve can be one in which fuel flow is proportional to the opening position of a valve member, the opening position being controlled by the aggregate fuel flow demand signal. For example, the opening position may be controlled by an actuator driven by the aggregate fuel flow demand signal. The actuator may be connected in a feedback control loop in which the actuator is energised by an error signal which is the difference between the aggregate fuel flow demand signal (which may be represented as a desired valve position signal) and a feedback signal representing the opening position of the valve member.

Indeed, a second aspect of the invention provides an engine, such as a gas turbine engine, fitted with the engine fuel control system having a fuel flow metering valve of the first aspect, the fuel flow metering valve regulating fuel flow to the engine.

A third aspect of the invention provides the use of the engine fuel control system having a fuel flow metering valve of the first aspect to regulate fuel flow to an engine, such as a gas turbine engine.

A fourth aspect of the invention provides a control system which provides an aggregate driven quantity demand signal for controlling an actuatable component, the system having:

summing junction which generates the aggregate driven quantity demand signal by summing a first output signal, which converges on a steady state driven quantity requirement value, and a change in driven quantity demand signal, a feedback loop which generates the first output signal in response to the aggregate driven quantity demand signal, and a first variable gain which tunes the change in driven quantity demand signal in response to a reference demand signal;

wherein the feedback loop includes a second variable gain which tunes the rate at which the first output signal converges on the steady state driven quantity requirement value. As the skilled person would recognise, in practical embodiments of the invention, the control system typically generates the aggregate driven quantity demand signal repeatedly (usually many times per second), and in the feedback loop the first output signal is generated by an aggregate driven quantity demand signal from a previous repeat, i.e. by a prior aggregate driven quantity demand signal. Typically, the reference demand signal corresponds to a desired value or desired change in value of a parameter which is itself varied or controlled by actuation of the actuatable component.

The engine fuel control system of the first aspect is an example of the more general control system of the fourth aspect. In other words, the control system of the fourth aspect is either (a) an engine fuel control system according to the first aspect, or (b) a control system which is other than an engine fuel control system according to the first aspect. Advantages and benefits discussed above in relation to the first aspect of the invention pertain also to the more general control system of the fourth aspect.

In the case of alternative (a): the aggregate driven quantity demand signal is an aggregate fuel flow demand signal; the actuatable component is a fuel flow metering valve which regulates a fuel flow to the engine; the steady state driven quantity requirement value is a steady state fuel flow requirement value; the change in driven quantity demand signal is an overfuelling demand signal; and the reference demand signal is a thrust or speed demand signal; wherein the engine fuel control system has a selector control system which includes the first variable gain, such that the selector control system generates the overfuelling demand signal in response to the thrust or speed demand signal.

In the case of alternative (b), the control system can be, for example, an engine-casing cooling air control system, or any other fluid flow feedback control system. The cooling air controlled by such a system allows the clearance between the casing and the blade tips of a turbine of the engine to be adjusted, for example to reduce leakage of working fluid between the casing and the tips. More particularly: the aggregate driven quantity demand signal may be an aggregate valve position demand signal; the actuatable component may be a valve which regulates a cooling air flow to an engine casing; the steady state driven quantity requirement value may be a steady state valve position requirement value; the change in driven quantity demand signal may be a change in valve position demand signal; and the reference demand signal may be a cooling air flow demand signal.

In other words, such an engine-casing cooling air control system provides an aggregate valve position demand signal for controlling the position of a valve which regulates a cooling air flow to an engine casing, the system having:
- a summing junction which generates the aggregate valve position demand signal by summing a first output signal, which converges on a steady state valve position requirement value, and a change in valve position demand signal,
- a feedback loop which generates the first output signal in response to the aggregate valve position demand signal, and
- a first variable gain which tunes the change in valve position demand signal in response to a cooling air flow demand signal;
- wherein the feedback loop includes a second variable gain which tunes the rate at which the first output signal converges on the steady state valve position requirement value.

The following optional features of the fourth aspect of the invention correspond to optional features of the first aspect of the invention.

The aggregate driven quantity demand signal, in response to which the feedback loop generates the first output signal, is typically the signal generated by the summing junction. Optionally, however, the signal generated by the summing junction may be modified by external factors (such as logic circuits which compare the signal with maximum and minimum driven quantity values) to provide an actual aggregate driven quantity demand signal in response to which the feedback loop generates the output signal.

The feedback loop may include a process model. For example, when the system is an engine-casing cooling air control system the process model may be an engine model. The process model may have an inverse static process module which determines steady state driven quantity values as a function of a steady state reference characteristic. For example, in an engine-casing cooling air control system, the reference characteristic can be the cooling air flow rate.

The feedback loop typically includes an integrator which, preliminary to the generation of the first output signal by the feedback loop, integrates an estimate of a rate of change of the reference characteristic to provide an estimate of the reference characteristic. The estimate of the rate of change of the reference characteristic can be used as an input to the process model.

Typically, the second variable gain varies as a function of the reference characteristic.

The feedback loop may receive a second output signal which converges on a value of the rate of change of the reference characteristic with driven quantity increment (i.e. valve position increment in the case of an engine-casing cooling air control system), the feedback loop combining the second output signal with the (prior) aggregate driven quantity demand signal to provide the estimated rate of change of the reference characteristic; and
- the feedback loop may have a subsidiary loop which generates the second output signal in response to the estimate of the reference characteristic, the second variable gain also tuning the rate at which the second output signal converges on the rate of change of reference characteristic with driven quantity increment.

For example, the first output signal may be subtracted from the (prior) aggregate driven quantity demand signal (e.g. at a further summing junction) to provide a change in driven quantity which is then multiplied with the second output signal to provide the estimated rate of change of the reference characteristic.

When the feedback loop contains a process model, preferably the process model has a transient-process module in the subsidiary loop which determines the rate of change of the reference characteristic with driven quantity increment as a function of the reference characteristic.

The second variable gain can act on the second output signal generated by the subsidiary loop before the second output signal is combined with the (prior) aggregate driven quantity demand signal. For example, when the subsidiary loop has a transient-process module, the second variable gain can act on the rate of change of the reference characteristic with driven quantity increment determined by the transient-process module.

In other embodiments, when the feedback loop includes a process model having an inverse static process module, the second variable gain can act on the steady state driven quantity value determined by the inverse static process module to modulate the value of the first output signal.

When the feedback loop includes an integrator, the second variable gain can act on the estimated rate of change of the reference characteristic before it enters the integrator. In other embodiments, the second variable gain can act on the estimated reference characteristic after it is provided by the integrator.

Elements of the control system (such as the summing junction, feedback loop, first variable gain) may be implemented by one or more suitably configured processors and typically also one or more memory devices.

Preferably, the control system further has an actuatable component (e.g. a valve) which is controlled by the aggregate driven quantity demand signal.

A fifth aspect of the invention provides an engine, such as a gas turbine engine, fitted with an engine-casing cooling air control system of the fourth aspect, the system controlling the actuation of a valve which regulates cooling air flow to a casing of the engine.

A sixth aspect of the invention provides the use of an engine-casing cooling air control system of the fourth aspect to actuate a valve and thereby to regulate cooling air flow to a casing of the engine, such as the casing of a gas turbine engine.

BRIEF DESCRIPTION OF THE DRAWINGS

Embodiments of the invention will now be described by way of example with reference to the accompanying drawings in which.

DETAILED DESCRIPTION

Engine Fuel Control System Embodiments

Figure 2:
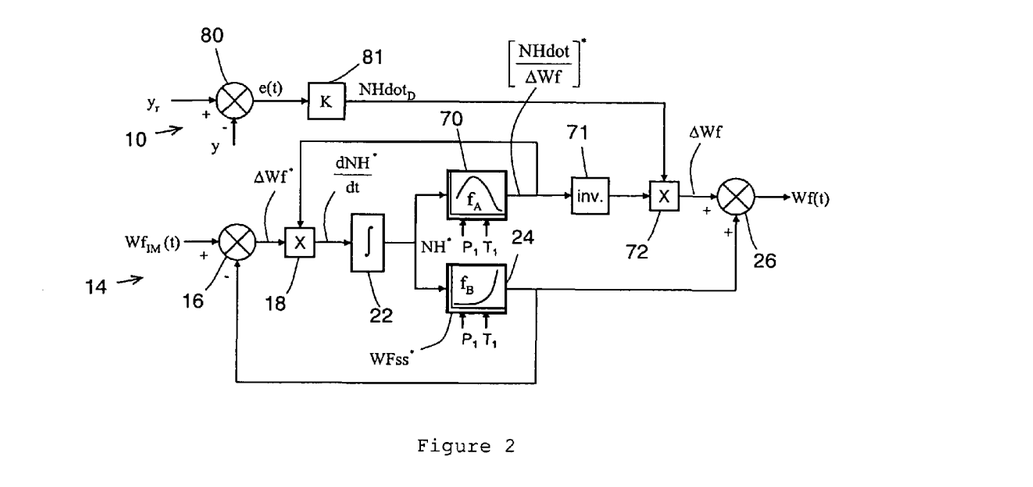
FIG. 2 shows the structure of the Rolls-Royce Inverse Model engine fuel control system.

Before describing engine fuel control system embodiments of the invention, it is helpful to consider in more detail the architecture of an engine fuel control system known as the Rolls-Royce Inverse Model, or RIMM. FIG. 2 shows the structure of the RRIM, which is similar to the engine fuel control system shown in FIG. 1.

The same reference numbers are used to indicate equivalent features in FIGS. 1 and 2, although in FIG. 2 Wf is used instead of F to indicate a fuel flow requirement, and ΔWf is used instead of ΔF to indicate an overfuelling requirement. To simplify matters, the system downstream from summing junction 26 is omitted from FIG. 2. The signal generator 6, engine speed error circuit 30 and acceleration limiter loop comparator 46 are replaced by a generic control error circuit 80 representing any control loop. The signal "$y_r$" is a vector of the reference values of the controlled engine outputs (corresponding to the $NH_D$ or $NHdot_D$ input into the selector control system 10 in FIG. 1) and "y" is the vector of the actual values of those controlled outputs (corresponding to the NH or NHdot output of the engine 2 in FIG. 1). Variable gain 81 represents both gain 62a and integrator 62b in FIG. 1. Because FIG. 2 represents only one control loop in the selector control system 10, logic block 42 in FIG. 1 is also omitted. The overfuelling requirement ΔWf generated by the selector control system 10 is produced when the $NHdot_D$ signal which outputs from variable gain 81 is multiplied at 72 with a (ΔWf/Nhdot)* value (see below).

In FIG. 1, the feedback loop 14 receives the actual aggregate fuel demand signal. In FIG. 2, on the other hand, the feedback loop 14 receives $Wf_{IM}$, where the subscript indicates a more general fuel flow feedback input to the inverse model. For example, that input can be the fuel flow demand, Wf(t), rather than the limited fuel signal $Wf_d$ as fed to the engine. In both FIG. 1 and FIG. 2, the controller subtracts from the fuel flow feedback at summer junction 16 the estimated steady state fuel signal Wfss* (Fss* in FIG. 1). The difference is then multiplied at 18 by the estimated rate of change of engine speed with fuel increment (NHdot/ΔWf)* (NHdot/ΔF in FIG. 1) to provide an estimate of engine acceleration dNH*/dt or NHdot*. As shown in FIG. 2, in the RRIM, the value for (NHdot/ΔWf)* comes from a subsidiary loop which generates (NHdot/ΔWf)* as a function of the estimate of the engine's speed NH* produced by integrator 22. More specifically, the value for NH* is passed from the integrator to a second engine model block 70, which generates the value for (NHdot/ΔWf)*. Similarly to the first engine model block 24, the (NHdot/ΔWf)* versus NH* characteristic of block 70 can be modified by input signals (temperature, pressure, air bleed, guide vanes etc.) to select the most appropriate member of a family of characteristics and to scale or correct the selected member in order to compensate for the changes in operating conditions.

The (NHdot/ΔWf)* value generated by engine model block 70 is also inverted at inverter 71 to produce a (ΔWf/Nhdot)* value, which is multiplied with the $NHdot_D$ signal at 72 to provide the overfuelling requirement ΔWf sent to summer 26.

The dynamics of the RRIM are tuned to the requirements of the engine via the data within the nonlinear modules, $f_B$ and $f_A$, of the first and second engine model blocks or modules 24, 70 respectively. The data within these tables can be calculated using an elaborate engine model which relates the output NH(s) to the input Wf(s), where "s" is the Laplace complex variable. Nonlinear module $f_A$ which is a piecewise continuous function is responsible for the high frequency gain of this relationship and nonlinear module $f_B$ which is a differentiable function contains the inverted static process characteristic of the engine regarding fuel flow to NH. The state of the control system models NH and is input to nonlinear modules $f_A$ and $f_B$. The aggregate fuel flow demand signal, Wf(t), is a summation of the steady state fuel flow requirement associated with NH*(t), Wfss*, and the incremental fuel flow demand, ΔWf, required to fulfil the acceleration demand $NHdot_D$. The acceleration demand reduces to zero and the NH* approaches to NH as the control error reduces to zero due to the integral action within the RRIM.

Figure 3:
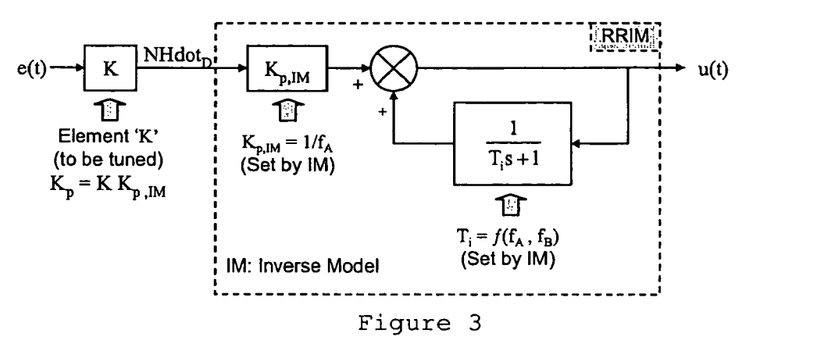
FIG. 3 shows a PI controller structure corresponding to the architecture of the system of FIG. 2.

The architecture of the RRIM controller can be shown to be closely analogous to the PI controller structure given in equation (1)

$$\frac{U(s)}{E(s)} = KK_{p,IM}\left(1 + \frac{1}{T_i s}\right) = K_p\left(1 + \frac{1}{T_i s}\right) \quad (1)$$

where U(s) is the Laplace transform of the fuel flow to the engine and E(s) is the Laplace transform of the difference between the set point and the process variable (including but not limited to three spool speeds, spool accelerations and any pressure/temperature to be controlled to a generic reference $y_r$ as shown in FIG. 2), $K_p$ is the overall proportional gain of the controller (the gain of the external element K multiplied with the gain of the inverse model or RRIM $K_{p,IM}$), and $T_i$ is the response rate. In the RRIM neither $K_{p,IM}$ nor $T_i$ are tuned or modified by any external means, i.e. they are non-variable and operate within the RRIM as the nonlinear characteristics of the engine. Equation (1) can be represented by the structure shown in FIG. 3.

The controller of FIG. 2, with the fuel input $Wf_{iM}$ fed directly from the output of the controller, is represented as a linearised controller in FIG. 3. This representation is used, with the linear engine model, in a linear analysis discussed below in relation to FIG. 5. In FIG. 3, integral control action is linearised to an automatic reset using a lag element within a positive feedback loop. Such a positive feedback can be seen to be present within the RRIM structure in FIG. 2, as the steady-state fuel flow requirement, Wfss*, is added to ΔWf and the resulting fuel flow demand, Wf(t), is fed back as Wf$_{IM}$(t). In FIG. 3, fuel flow limiters are ignored for simplicity. Alternatively, the limited fuel signal Wf$_d$ as fed to the engine can be used as feedback to the controller.

The lag element within FIG. 3 is emulated in the RRIM by the integrator 22 within the negative feedback loop 14, the time constant analogous to T$_i$ being a function of the outputs of the engine modules f$_A$ and f$_B$. The proportional gain of the RRIM, 1/f$_A$, can therefore be seen to be the inverse of the engine's parameter f$_A$ responsible for the high frequency gain. The integral gain, K$_i$, of the PI controller in the classical form of FIG. 3 as embedded in the RRIM controller is given in equation (2).

$$K_i = \frac{K_p}{T_i} = K \frac{df_B}{dNH} \quad (2)$$

The integral gain of the RRIM controller is therefore given by the slope of the inverted static process characteristic, f$_B$ multiplied with the external gain K.

The relations f$_A$ and f$_B$ can accommodate the effect of changes in operating conditions. A convenient way to achieve this is to store these engine functions as referred parameters, thereby scheduling the controller gains according to changes in altitude and Mach number. The simulation studies discussed below represent sea level static conditions.

As discussed earlier, the RRIM controller can be seen to be a nonlinear PI controller in which the proportional and integral terms are a function of the state of the controller.

However, the application of the RRIM control system to a high bypass ratio turbofan can result in an inadequate phase margin for certain loops when the required bandwidth is attained.

Figure 4:
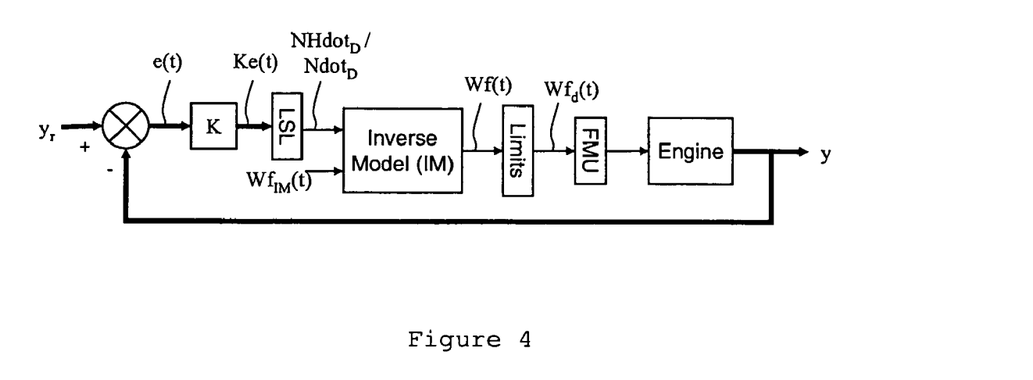
FIG. 4 shows a generalized representation of a closed-loop simulation using the engine fuel control system of FIG. 2.

FIG. 4 shows a generalized representation of a closed loop simulation using the RRIM (i.e. a simulation in which the fuel flow into the engine is determined by the RRIM control algorithm), where the outer feedback path represents all measured variables (represented by thick line), the gain K can be considered as a diagonal matrix of gains for all control loops in the selector control system, LSL represents the loop selection logic (corresponding to logic block 42 in FIG. 1), and FMU represents a fuel management unit (corresponding to fuel system 8 in FIG. 1). As previously, "y$_r$" is a vector of the reference values of the controlled engine outputs (corresponding to the NH$_D$ or NHdot$_D$ input into the selector control system 10 in FIG. 1) and y is the vector of the actual values of those controlled outputs (corresponding to the NH or NHdot output of the engine 2 in FIG. 1). As well as providing control loops for NH and NHdot, the simulation also provides control loops to control the engine outputs NI, NL, P$_3$ (compressor output pressure), EPR and any other outputs to be controlled.

Figure 5:
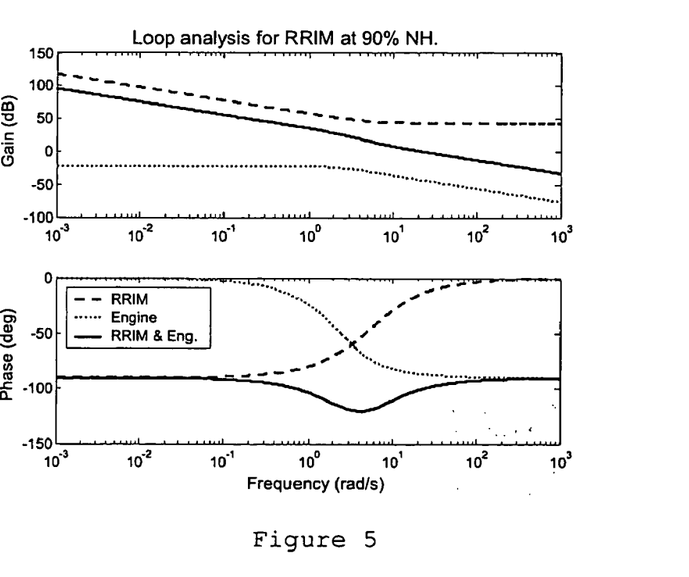
FIG. 5 is a Bode plot showing a linear analysis of the control system to the right hand side of the loop selection logic, LSL, in FIG. 4.

The inverted static process characteristic, f$_B$, was found by running an aero-thermodynamic gas turbine simulation of a three-spool gas turbine engine. The simulation gives the behaviour of the engine in response to fuel, variable inlet guide vane and bleed valve inputs. All major speeds, temperatures and pressures are output from the simulation in open loop (i.e. without the presence of a control system) at a series of operating points defined by NH. The dynamic engine characteristic, f$_A$, was found by applying a small increment in fuel flow to the engine at each of the operating points used for the steady state analysis. The data in f$_A$ are then the initial value of NHdot, scaled according to the magnitude of the fuel flow increment. FIG. 5 is a Bode plot showing the subsequent linear analysis of the control system to the right hand side of the loop selection logic, LSL, in FIG. 4, i.e. the RRIM in series with the engine model (the corresponding plot being labelled as "RRIM & Eng.").

The gain, K, for each steady state control loop was tuned to give the required control loop bandwidth which varies for each loop and across the operating envelope. Table 1 provides the phase margins determined from linear analyses of each tuned control loop, and shows that a phase margin of 60° is met across the operating range for all the control loops except NL and NI. In the case of these two control loops, the tuning of the gain, K, to meet the required bandwidth resulted in phase margins that were significantly below 60° for large proportions of the operating regime of some loops other than NH.

TABLE 1

| NH(%) | NH  | NI  | NL  | P$_3$ | EPR  | NHdot |
|-------|-----|-----|-----|-------|------|-------|
| 55    | 75° | 46° | 51° | 113°  | 115° | 70°   |
| 60    | 72° | 31° | 50° | 104°  | 108° | 66°   |
| 65    | 69° | 28° | 50° | 97°   | 97°  | 64°   |
| 70    | 66° | 34° | 27° | 62°   | 60°  | 60°   |
| 75    | 69° | 48° | 31° | 62°   | 64°  | 64°   |
| 80    | 61° | 57° | 37° | 74°   | 76°  | 51°   |
| 85    | 65° | 58° | 43° | 72°   | 75°  | 55°   |
| 90    | 63° | 56° | 47° | 73°   | 76°  | 48°   |
| 95    | 62° | 61° | 52° | 76°   | 79°  | 47°   |
| 100   | 62° | 61° | 48° | 77°   | 81°  | 46°   |
| 105   | 61° | 60° | 39° | 77°   | 82°  | 45°   |

Overall, the frequency response behaviour of the system to the right of LSL in FIG. 4 was sub-optimal. The gains required to give the necessary bandwidth for each control loop resulted in insufficient phase margin in the NL and NI limiter loops.

The RRIM fuel control system of FIG. 2 represents a control strategy offering a nonlinear modulation of fuel to control NH or NHdot. The nonlinear behaviour of the control system is based on two engine modules f$_A$ and f$_B$, which are used to mimic NH dynamics of the engine, such that the integration time of the control system matches the time constant of the NH response changing nonlinearly with the operating condition. Whilst this can be an attractive solution for NH or NHdot control, it can have short-comings for the control of other engine parameters such as EPR (engine pressure ratio), NI (intermediate pressure shaft speed) and NL (low pressure shaft speed), particularly in a three-spool engine.

Fuel control systems according to the present invention, however, can address these short-comings. The strategy adopted in these control systems is collectively termed the Modified Rolls-Royce Inverse Model (MRIMM).

In the MRRIM strategy of control, the engine modules f$_A$ and f$_B$ from the RRIM can be retained to capture the nonlinear behaviour of the engine and other control design requirements. However, in the MRRIM, it is possible to set the integration time of the control system to be greater or less than the time constant of the NH dynamics. This allows an improved trade-off between the bandwidth and stability of a control loop to be achieved.

Figure 6:
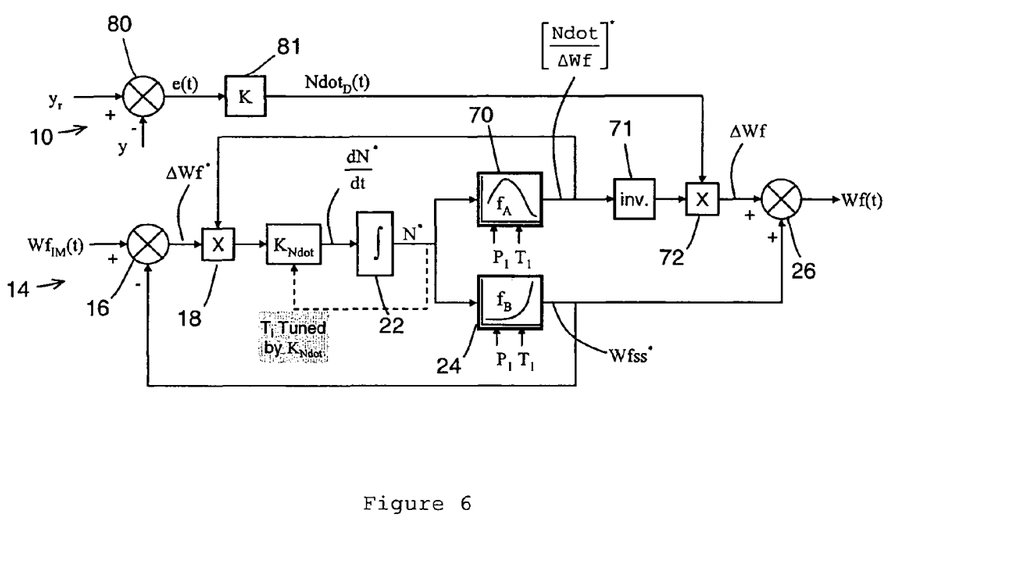
FIG. 6 shows a first example of an engine fuel control system according to the present invention.

FIG. 6 shows a first example of an engine fuel control system according to the present invention. Relative to the RRIM system of FIG. 2, a second variable gain, K$_{Ndot}$, has been introduced into feedback loop 14 between multiplier 18 and integrator 22. The gain K$_{Ndot}$ adjusts the integral gain of the RRIM without adjusting the proportional gain.

In the RRIM approach, the integration time associated with the feedback loop in the controller follows the nonlinear variations in the time constant, $\tau_{NH}$, associated with the NH response of the engine. However, this approach is too conservative to achieve all control design requirements in time domain and frequency domain. The additional gain $K_{Ndot}$ (and its counterparts $K_N$, $K_A$, and $K_B$ applied in the alternative examples discussed below) provides the opportunity to scale the integration time of the controller. Thus the nonlinear behaviour of the engine is captured through the engine modules $f_A$ and $f_B$, and the linear design requirements are fulfilled by adjusting the additional gain in the MRRIM.

Figure 7:
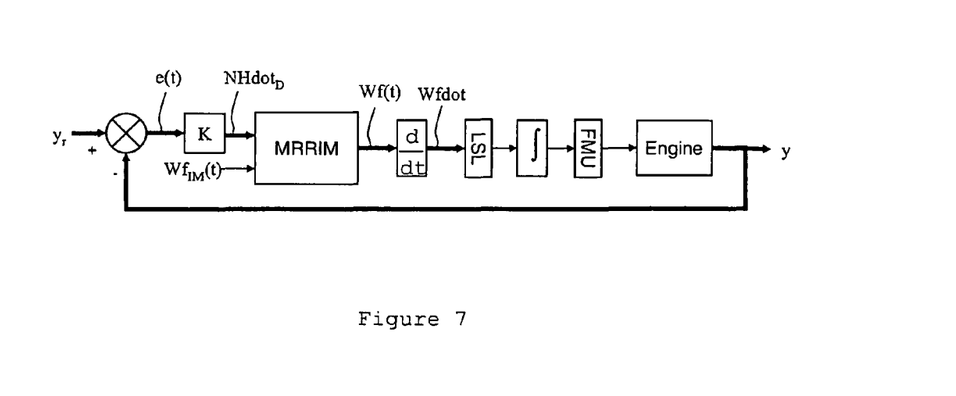
FIG. 7 shows a modification of the closed-loop simulation of FIG. 4 which may be applied to the engine fuel control system of FIG. 6.

For example, if it is required that the integration time of the EPR control loop should be set as $\beta\tau_{NH}$ ($\beta \neq 1$ and $\tau_{NH}$ being the variable time constant representing NH dynamics), then this can be achieved by setting $K_{Ndot}$ as $1/\beta$. If $\beta$ should be different for different control loops, then the configuration of FIG. 7 can be adopted, in which each control loop has a different effective MRRIM, implemented by a respective $K_{Ndot}$ tuned for each control loop individually. Otherwise, if $K_{Ndot}$ should be tuned identically for all control loops, the previous feedback configuration of FIG. 4 can be adopted by substituting MRRIM for RRIM.

The RRIM can be characterised by the integral time, $T_i$, and proportional gain for fuel flow increment ($\Delta Wf$), $K_{p,IM}$, from equations (3) and (4):

$$\frac{1}{T_i} = f_A \frac{df_B}{dNH} = \frac{1}{\tau_{NH}^*} \quad (3)$$

$$K_{p,IM} = 1/f_A \quad (4)$$

In equation (3), $\tau_{NH}^*$ is the estimate of the time constant, $\tau_{NH}$, associated with NH dynamics of the engine. The control system's proportional gain resulting from the engine model based on engine modules $f_A$ and $f_B$, indicated in equation (4) as $K_{p,IM}$, cannot be tuned/changed, as the look-up table $f_A$ is a characteristic of the engine. However, $K_{p,IM}$ is scaled by the variable proportional gain, K, to allow tuning of the closed loop RRIM control system. In the generalised PI controller of FIG. 3:

$$K_P = KK_{p,IM} \quad (5)$$

Similarly, the integration time of the control system is bound to follow the estimated time constant associated with the NH dynamics, $\tau_{NH}^*$, as shown in equation (3). In contrast, in the MRRIM control system of FIG. 6 the integration time, $T_i$, has a relation with the time constant, $\tau_{NH}^*$, as well as the tuning parameter, $K_{Ndot}$, as indicated in equation (6):

$$\frac{1}{T_i} = K_{Ndot} f_A \frac{df_B}{dN^*} \quad (6)$$

However, since $df_B/dN^*$ still represents the slope of the steady state module, it follows that:

$$\frac{1}{T_i} = \frac{K_{Ndot}}{\tau_{NH}^*(N^*)} \quad (7)$$

Thus $T_i$ can be adjusted to achieve design requirements that are beyond the capability of the RRIM controller. One way of doing this is to neutralise phase mismatches between the control system and the engine. The possibility to tune $K_{Ndot}$ as a variable gain and thereby adjust $T_i$ is indicated in FIG. 6 by the dashed line connecting $K_{Ndot}$ to the integrator. Note also that the example of FIG. 6 includes the possibility to base the engine model on any of the shaft speeds NH, NI or NL. The use of "N", rather than "NH" to indicate shaft speed in FIG. 6 and equations (6) and (7) emphasises that, depending on the value of $K_{Ndot}$, the modelled speed in the MRRIM can be slower or faster than the shaft speed that the engine modules $f_A$ and $f_B$ represent.

Figure 8:
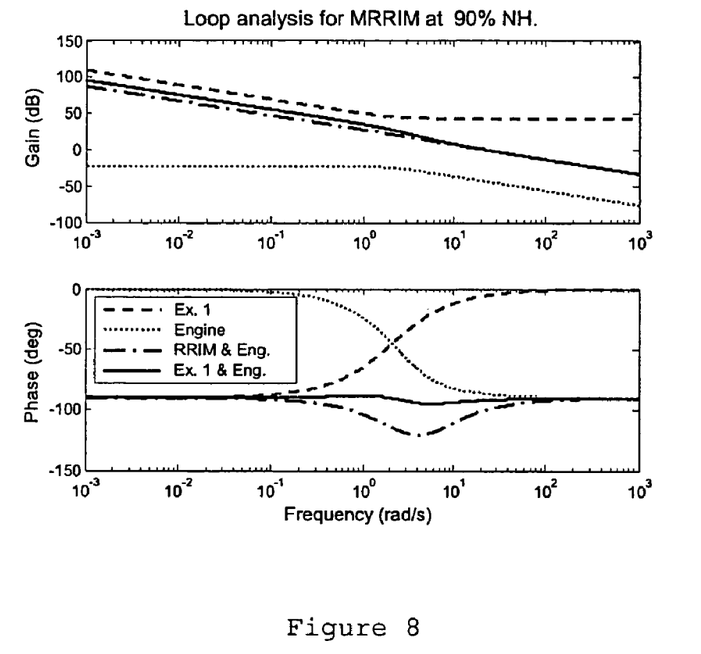
FIG. 8 is a Bode plot showing a linear analysis of the control system of FIG. 6 for comparison with the Bode plot of FIG. 5.

As mentioned above, one way of tuning $K_{Ndot}$ is to make it a schedule of the modelled speed N* or the measured speed NH so that the modifying gain is non-unity at a speed where there is a phase mismatch between the engine model represented by $f_A$ and $f_B$ and a more accurate higher order model representing the whole engine. Note that the higher order linear model was used to perform the linear analysis of phases margin and bandwidth. To illustrate the neutralisation of phase mismatches, FIG. 8 is a Bode plot showing a linear analysis of the MRRIM control system of FIG. 6 (implementing the control loop structure of FIG. 4 with MRIMM substituting for RRIM) for comparison with the Bode plot of FIG. 5, $K_{Ndot}$ having been tuned to reduce phase mismatches between the controller and the engine. In FIG. 6, the MRRIM in series with the engine model is labelled as "Ex. 1 & Eng.". The tuning introduced by $K_{Ndot}$ has the effect of moving the zero of the linear representation of the RRIM at a given operating point. By making $K_{Ndot}$ less than unity, the integral gain of the RRIM is decreased. This provides phase lead at lower frequencies. Modifying the integral gain reduces the phase lag seen at frequencies around crossover on the Bode plot. This results in a system in which all the control loops conform better to frequency domain requirements without lead compensation, whereby the stability of the control system is maintained while improving its performance.

Table 2 provides the phase margins determined from linear analysis of each tuned control loop for comparison with the phase margins of Table 1.

TABLE 2

| NH(%) | NH | NI | NL | $P_3$ | EPR | NHdot |
| --- | --- | --- | --- | --- | --- | --- |
| 55 | 92° | 63° | 68° | 131° | 132° | 87° |
| 60 | 99° | 58° | 77° | 131° | 135° | 94° |
| 65 | 103° | 62° | 84° | 131° | 131° | 98° |
| 70 | 102° | 71° | 63° | 98° | 97° | 97° |
| 75 | 104° | 82° | 65° | 96° | 99° | 99° |
| 80 | 82° | 78° | 58° | 95° | 97° | 72° |
| 85 | 85° | 79° | 63° | 92° | 95° | 75° |
| 90 | 81° | 74° | 65° | 92° | 95° | 66° |
| 95 | 76° | 75° | 66° | 90° | 93° | 61° |
| 100 | 76° | 75° | 62° | 91° | 95° | 60° |
| 105 | 76° | 75° | 54° | 93° | 97° | 61° |

A significant improvement in phase margins results. In particular, only one phase margin in the NL and NI limiter loops is now less than 60°.

Figure 9:
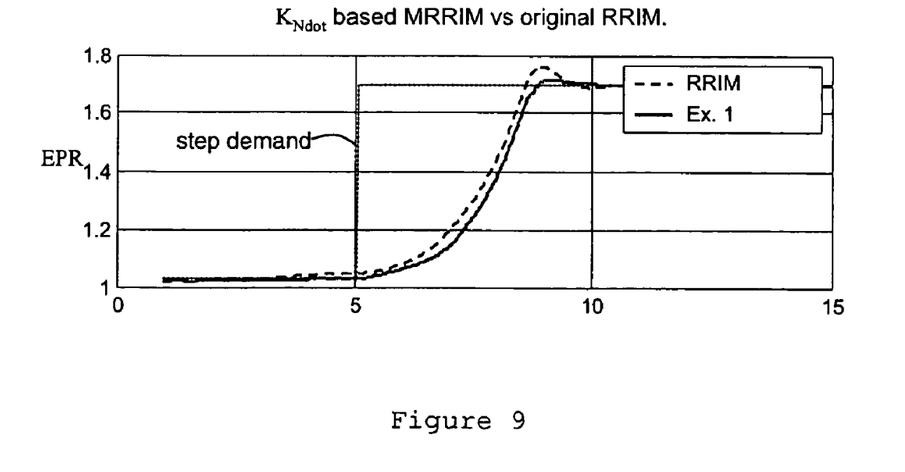
FIG. 9 is a plot of Engine Pressure Ratio (EPR) against increments of time in response to a step demand for the systems of FIG. 2 and FIG. 6.

The improvement in the step response can be seen in FIG. 9 which plots EPR against increments of time in response to a step demand in EPR at around 5s. For this plot, the MRRIM control system of FIG. 6 again implements the control loop structure of FIG. 4 (with MRIMM substituting for RRIM). The response of the RRIM control system is shown for comparison. The RRIM is good at decreasing the rise time, but at the expense of relatively high overshoots and low stability margins. The example MRRIM control system, on the other hand, can produce a similar response time with significantly lower overshoots and better stability margins. In FIG. 9, each EPR response is the cumulative response of all the control loops selected by the loop selection logic LSL, the output of the LSL being a scalar value for NHdot$_D$ selected by the LSL out of the NHdot demands of all the loops.

This example illustrates how the MRRIM strategy can overcome shortcomings of the conventional RRIM control design. However, the additional gain K$_{Ndot}$ can be tuned in other ways. The gain can be further tuned, for example, to improve the NI loop at 60%NH where it was 2% below the required phase margin.

Figure 10:
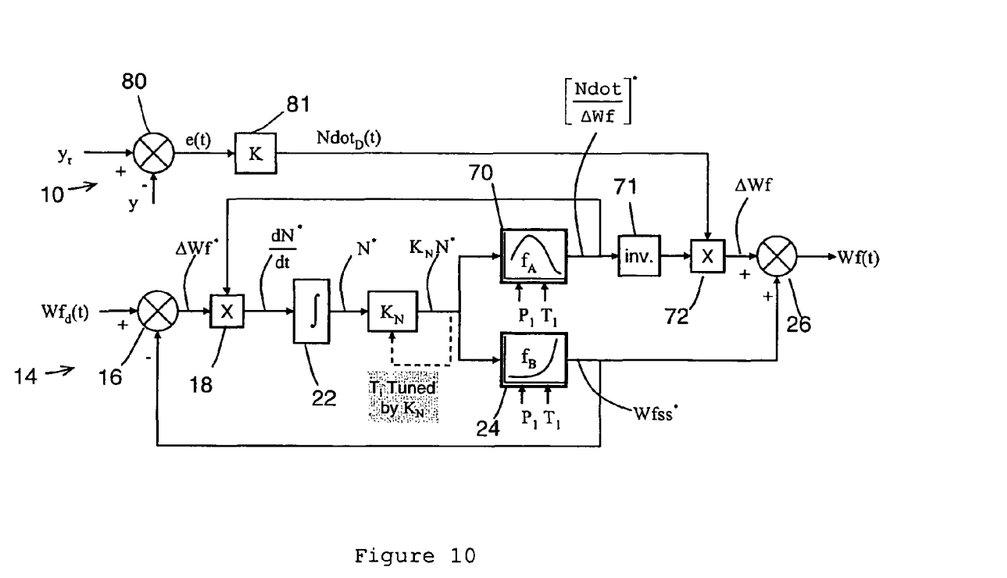
FIG. 10 shows a second example of an engine fuel control system according to the present invention.

FIG. 10 shows a second example of an MRRIM engine fuel control system according to the present invention. A second variable gain, K$_N$, has now been introduced into feedback loop 14 after integrator 22. In contrast, the second variable gain, K$_{Ndot}$, of the first example was positioned before the integrator.

Again, an effect of the gain K$_N$ is to adjust the integral gain without adjusting the proportional gain. However, relative to the first example, the controller response will be more sensitive to K$_N$ variations as compared to K$_{Ndot}$ variations. The reason is that K$_N$ is the modifier for the modelled NH, while K$_{Ndot}$ only varies the rate of change of NH*. As a result, in the second example, the modelled speed N* differs from the actual speed NH* by a factor of K$_N$ in steady state.

In this example, the two parameters of the inverse model controller will change according to equations (8) and (9):

$$\frac{1}{T_i} = K_N f_A(N_s^*) \frac{df_B}{dN_s^*} \quad (8)$$

$$K_{p,IM} = 1/f_A(N_s^*) \quad (9)$$

where N* is related to N$_S$* as shown in equation (10):

$$N_s^* = K_N N \quad (10)$$

Since df$_B$/dN$_s$* still represents the slope of the steady state module:

$$\frac{1}{T_i} = \frac{K_N}{\tau_{NH}^*(N_s^*)}. \quad (11)$$

Thus, K$_N$ can be used to tune the controller in such a way that the integration time of the controller at any time is equal to the time constant of the NH dynamics measured at the scaled shaft speed, N$_s$*.

Figure 11:
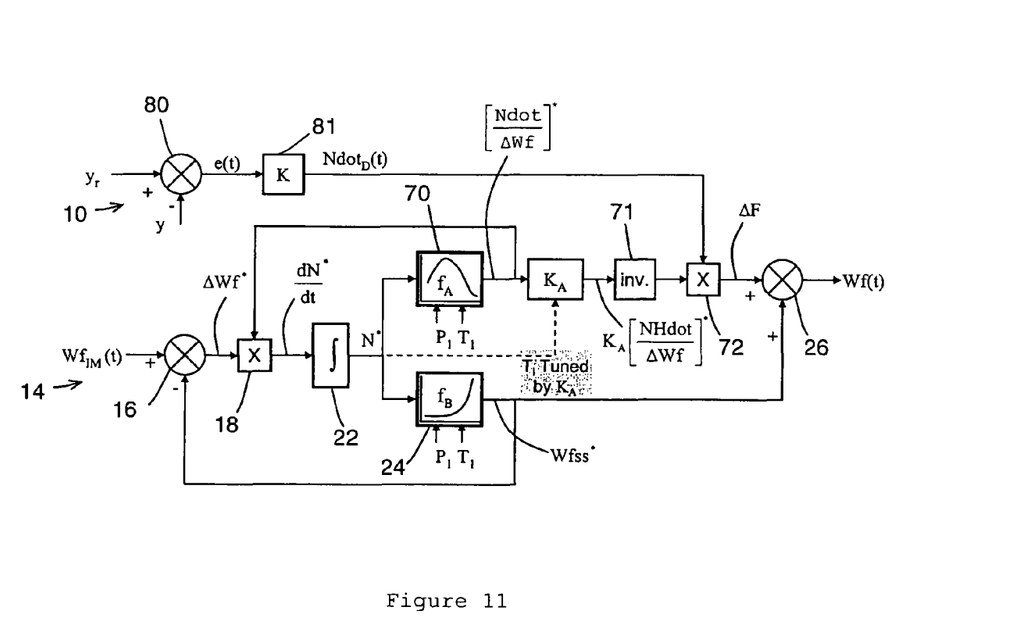
FIG. 11 shows a third example of an engine fuel control system according to the present invention.

FIG. 11 shows a third example of an MRRIM engine fuel control system according to the present invention. A second variable gain, K$_A$, has now been introduced into the output of the engine module f$_A$ before it is applied to the subsidiary loop or used to calculate the incremental fuel flow demand on engine ΔWf.

In this example, the integration time has a relation with the tuning parameter K$_A$ as given in equation (12), and the proportional action of the inverse model is depicted by 1/K$_A$f$_A$ as indicated by equation (13):

$$\frac{1}{T_i} = K_A f_A \frac{df_B}{dN^*} \quad (12)$$

$$K_{p,IM} = 1/(K_A f_A) \quad (13)$$

In the example of FIG. 11, K$_A$ may be varied using inputs such as the measured speed NH or the modelled speed N* as shown by the dotted line into K$_A$ in FIG. 11. In this configuration of the MRRIM, the integration time T$_i$ can be tuned independently using K$_A$ to minimise, for example, the phase mismatch between the engine and its inverse at a frequency of interest, and K$_p$ can be tuned afterwards to satisfy some other criteria such as a bandwidth requirement. The K$_A$ coupling between K$_p$ and T$_i$ can generally be ignored.

Figure 12:
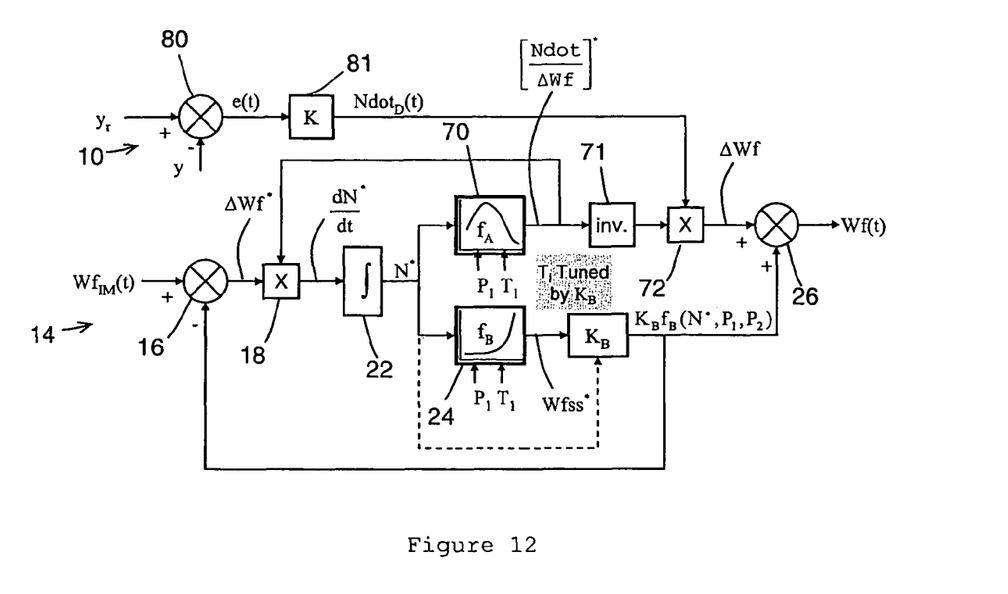
FIG. 12 shows a fourth example of an engine fuel control system according to the present invention.

FIG. 12 shows another example of an MRRIM engine fuel control system according to the present invention. In this example, a second variable gain K$_B$ scales the output of the engine module f$_B$ so that the fuel flow increment in the model, ΔWf*.

The integration time now has a relation with the tuning parameter K$_B$ as given in equation (14). In this equation it is assumed that K$_B$ may be varied as shown by the dotted line into K$_B$ in FIG. 12. The proportional action of the new inverse model is the same as that of the RRIM controller, i.e. equal to 1/f$_A$ as shown in equation (15):

$$\frac{1}{T_i} = f_A\left(K_B \frac{df_B}{dN^*} + f_B \frac{dK_B}{dN^*}\right) \quad (14)$$

$$K_{p,IM} = 1/(f_A) \quad (15)$$

The integration time of the MRRIM control system of FIG. 12 depends upon the slope of the second gain K$_B$. This makes the tuning of K$_B$ more complicated compared to the tuning of K$_{Ndot}$ in the example of FIG. 6. However, in the case of a constant gain, K$_B$, the slope of the gain becomes zero, and the T$_i$ relation in equation (14) simplifies to:

$$\frac{1}{T_i} = K_B f_A \frac{df_B}{dN^*}, \quad (16)$$

whereby the integration time can be determined by scaling the estimated time constant of the engine τ$_{NH}$* as in equation (17):

$$\frac{1}{T_i} = \frac{K_B}{\tau_{NH}^*(N^*)} \quad (17)$$

Other Embodiments

The approach of introducing a second variable gain into a feedback loop to tune the rate at which the output signal generated by the loop converges on a steady state fuel flow requirement can be applied to control driven quantities other than fuel flows. For example, the driven quantity can be the position of a valve which regulates the flow of cooling air to an engine casing.

Figure 13:
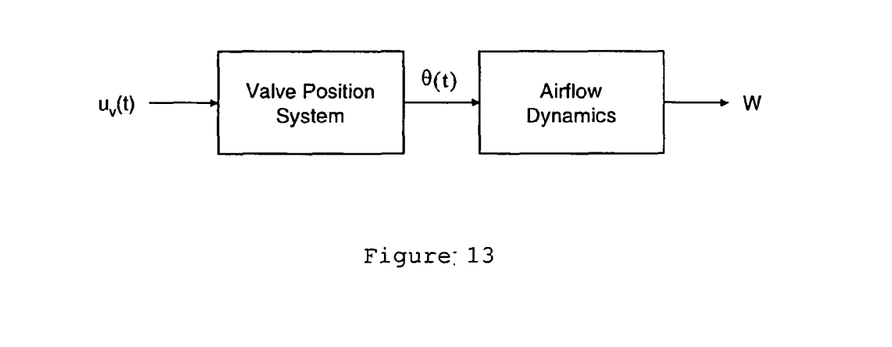
FIG. 13 shows schematically the relation between the input to a valve positioning system and the resultant flow rate of cooling air to an engine casing.

FIG. 13 shows schematically the relation between the input, u$_r$(t), to a valve positioning system and the resultant flow rate, W, of cooling air to the casing. The input is typically a torque motor current used to activate a mechanical actuator controlling the valve position.

In most cases, the dynamics of the valve actuator and the dynamics of the cooling air flow can be modelled separately so that the fluid flow dynamics can be associated with the position of the valve, θ(t), instead of with the input applied to position the valve. Also, the static relationship between the input to the valve actuation system and the position of the valve generally follows a straight line, which means the steady state gain of the valve actuator is a constant. Typically, therefore, the valve dynamics are subordinate to the fluid flow dynamics. However, the engine-casing cooling air control system described below can be adapted to merge the dynamics of the valve with the dynamics of the fluid flow, such that the feedback loop within the controller operates on, for example, the torque motor current rather than the actual valve position.

The cooling air control system utilises an inverse model having two modules, $f_1$ and $f_2$, analogous to the nonlinear modules, $f_A$ and $f_B$ of the MRRIM fuel control system described above. These two modules are illustrated schematically in FIG. 14. Steady state module $f_2$ 124 approximates the steady state position, $\theta_{SS}$, of the valve, in the absence of a change in flow request, as a function of flow rate, W. Transient module $f_1$ 170 estimates the rate of change of flow per unit change in valve position, Wdot/$\Delta\theta$, in the presence of a control error, as a function of flow rate, W.

Figure 14:
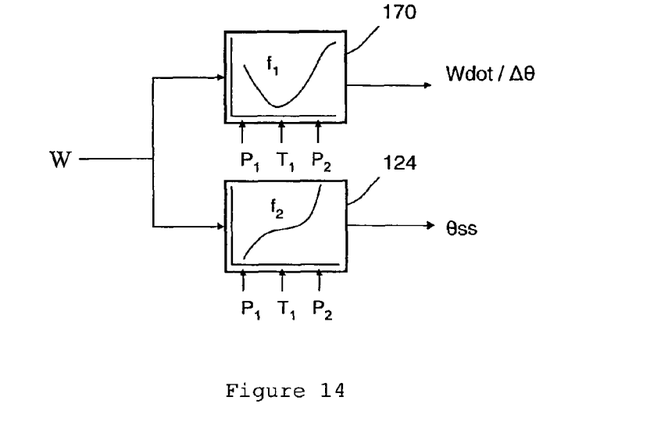
FIG. 14 shows schematically two modules of a cooling air control system valve inverse model.

In addition to the flow rate, W, the steady state and transient modules may have further inputs such as inlet pressure $P_1$, inlet temperature $T_1$ and outlet pressure $P_2$ across the air modulating valve. These inputs are used to calculate a valve position or change in position according to the operating condition of the valve.

Figure 15:
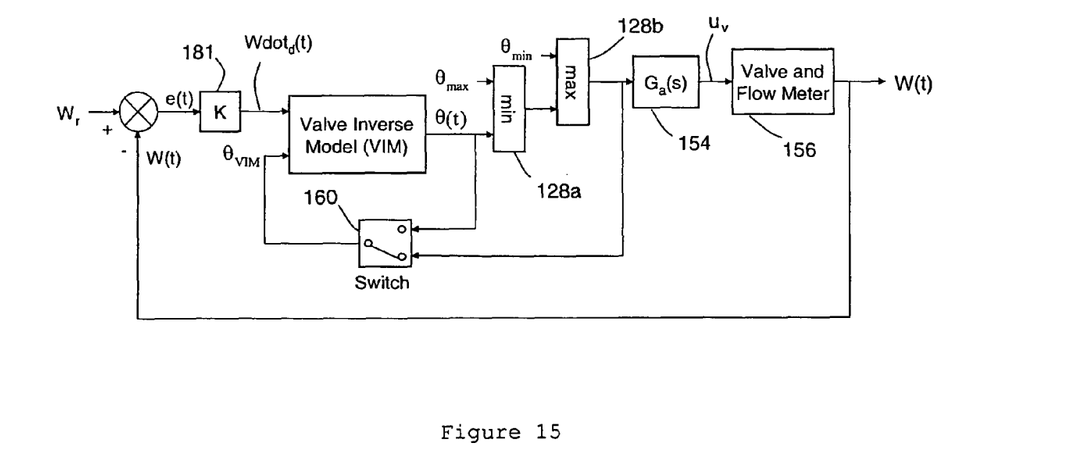
FIG. 15 shows the general architecture of a closed loop control system for controlling the flow of engine casing cooling air.

FIG. 15 shows the general architecture of a closed loop control system for controlling the flow of engine casing cooling air. The outer feedback path represents the measured cooling air flow rate, W(t). There is no selector control system because there is only one control loop. $W_r$ is the requested cooling air flow rate. The gain K operates on the control error e(t) between W(t) and $W_r$ to produce the rate of change of fluid flow demand, Wdot$_d$, and can be constituted as a component 181 which is, for example, a proportional controller or a lead compensator.

In FIG. 15, the inverse model is shown by a simplified block 'Valve Inverse Model' (VIM). The VIM has two inputs, the rate of change of fluid flow demand, Wdot$_d$, and the aggregate position demand on the valve, $\theta_{VIM}$. Optionally, $\theta_{VIM}$ is selected by a switch 160 between two inputs: the output of the VIM and the output of minimum 128a and maximum 128b limiters acting on the output of the VIM.

The input to the valve actuator system is the limited VIM output. A transfer function $G_a(s)$ 154 having a time constant much smaller than the time constant of the valve models the actuator dynamics and produces a value for the input, $u_v$, to the valve positioning system 156 from the limited VIM output. Alternatively, $u_v$ can be calculated from a first order polynomial or lookup table of steady state valve positions against the steady state input levels required to position the valve.

Figure 16:
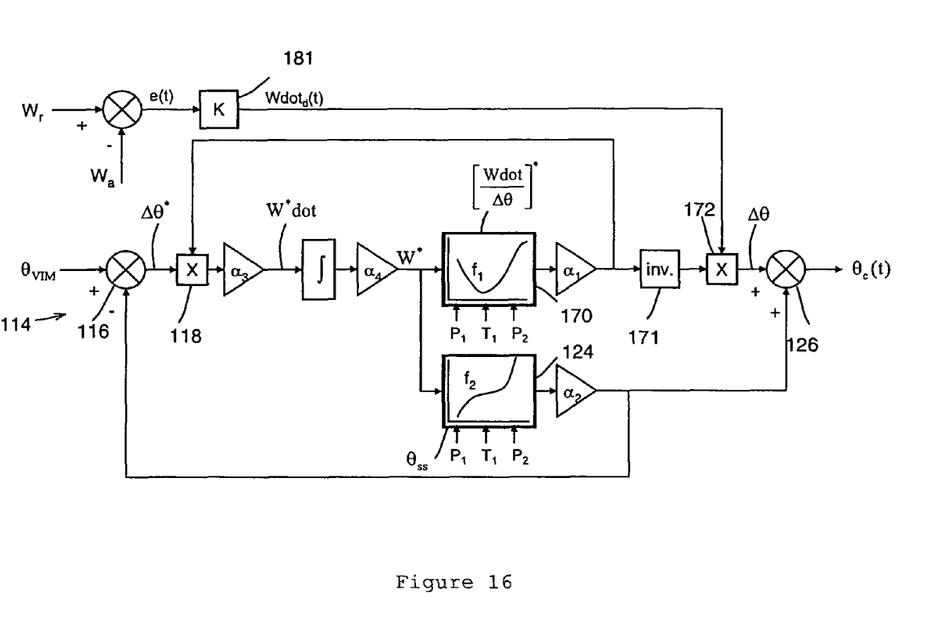
FIG. 16 shows the more detailed architecture of the valve inverse model and inner feedback loop of the control system of FIG. 15, and demonstrates four options for the second variable gain corresponding to the arrangements of FIGS. 6 and 10 to 12.

FIG. 16 shows more detail of the VIM and inner feedback loop 114 of which it forms a part.

The position input $\theta_{VIM}$ is connected to the output of the summing junction 126. The input to the VIM is the rate of change of fluid flow demand, Wdot$_d$, introduced at the multiplier 172.

A modelled increment in the valve position, $\Delta\theta^*$, is calculated by subtracting at 116 the steady state valve position, $\theta_{ss}$, from the inverse model valve position input $\theta_{VIM}$. $\theta_{ss}$ is calculated from the steady state module 124 against the modelled flow W*. The modelled increment in valve position is multiplied with the output of the transient module 170, such that the output of multiplier 118 is a modelled acceleration, W*dot.

The output of the transient module 170, which is used to model the flow dynamics, is inverted at inverter 171 and multiplied with the rate of change of fluid flow demand, Wdot$_d$, at the junction 172. The result is an incremental position demand that can fulfil the rate of change of fluid flow as demanded at the input to the inverse model. This demand is added to the output of the steady state module 124 so that the output of the summing junction is an absolute position of the valve to be set in order to achieve the demanded rate of change of fluid flow, Wdot$_d$.

In FIG. 16, there are also four possible additional gains $\alpha_1$, $\alpha_2$, $\alpha_3$ or $\alpha_4$, such that any one of the four gains $\alpha_i$, where i=1, 2, 3, 4, can be set as non-unity. In this way, the integration time of the controller can be set to follow the nonlinearly varying time constant of the system such that the time constant of the system is $\alpha_i$ times the integration time of the controller. Thus if $\alpha_i$ is constant, the integration time of the controller will linearly relate to the time constant of the system. It is, however, possible to tune the additional gain with different conditions of operation. Only one of the additional gains is needed to achieve the integral time modifications for scaling it with respect to the time constant of the system.

The present invention can be applied to control of other driven quantities. Thus it is not limited to control of fuel or control of valve position, and is not limited to turbine engine contexts.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A control system which provides an aggregate driven quantity demand signal for controlling an actuatable component, the system comprising:
    a summing device which generates the aggregate driven quantity demand signal by summing a first output signal, which converges on a steady state driven quantity requirement value, and a change in driven quantity demand signal,
    a feedback loop which generates the first output signal in response to the aggregate driven quantity demand signal, and
    a first variable gain unit which tunes the change in driven quantity demand signal in response to a reference demand signal;
    wherein the feedback loop includes a second variable gain unit which tunes a rate at which the first output signal converges on the steady state driven quantity requirement value.

2. A control system according to claim 1, wherein the feedback loop includes an inverse static process module which determines steady state driven quantity values as a function of a steady state reference characteristic.

3. A control system according to claim 1, the control system being a fluid flow engine-casing cooling air control system, wherein:
    the aggregate driven quantity demand signal is an aggregate valve position demand signal,
    the actuatable component is a cooling air flow metering valve which regulates a cooling air flow to an engine casing,
    the steady state driven quantity requirement value is a steady state valve position requirement value,
    the change in driven quantity demand signal is a change in valve position demand signal and
    the reference demand signal is a cooling air flow demand signal.

4. A control system according to claim 1, wherein the feedback loop includes an integrator device which, preliminary to the generation of the first output signal by the feedback loop, integrates an estimate of a rate of change of a reference characteristic to provide an estimate of the reference characteristic.

5. A control system according to claim 4, wherein the feedback loop receives a second output signal which converges on a value of the rate of change of the reference characteristic with a driven quantity increment, the feedback loop combining the second output signal with the aggregate driven quantity demand signal to provide the estimated rate of change of the reference characteristic; and the feedback loop has a subsidiary loop which generates the second output signal in response to the estimate of the reference characteristic, the second variable gain unit also tuning the rate at which the second output signal converges on the rate of change of reference characteristic with the driven quantity increment.

6. A control system according to claim 5, wherein the feedback loop includes a transient process module in the subsidiary loop which determines the rate of change of the reference characteristic with the driven quantity increment as a function of the reference characteristic.

7. A control system according to claim 4, wherein the second variable gain unit acts on the estimated rate of change of the reference characteristic (i) before it enters the integrator device, or (ii) after it is provided by the integrator device.

8. A control system according to claim 5, wherein the second variable gain unit acts on the second output signal generated by the subsidiary loop before the second output signal is combined with the aggregate driven quantity signal.

9. A control system according to claim 2, wherein the second variable gain unit acts on the steady state driven quantity requirement determined by the inverse static process module to modulate the value of the first output signal.

10. A control system according to claim 1, wherein the second variable gain unit varies as a function of a modelled or actual value of a reference characteristic.

11. A control system according to claim 1, wherein the summing device, the feedback loop and the first variable gain unit are provided by one or more processors.

12. A control system according to claim 1, further comprising an actuatable component which is controlled by an aggregate valve position demand signal.

13. A control system according to claim 1, the control system being an engine fuel control system, wherein:
the aggregate driven quantity demand signal is an aggregate fuel flow demand signal,
the actuatable component is a fuel flow metering valve which regulates a fuel flow to the engine,
the steady state driven quantity requirement value is a steady state fuel flow requirement value,
the change in driven quantity demand signal is an overfuelling demand signal, and
the reference demand signal is a thrust or speed demand signal,
wherein the engine fuel control system has a selector control system which includes the first variable gain unit, such that the selector control system generates the overfuelling demand signal in response to the thrust or speed demand signal.

14. A control system according to claim 13, wherein the feedback loop includes an engine model which has an inverse static process module which determines steady state fuel flow requirement as a function of steady state engine speed.

15. A control system according to claim 13 further comprising a fuel flow metering valve which is controlled by the aggregate fuel flow demand signal.

16. A control system according to claim 15, the control system fitted to an engine, wherein the fuel flow metering valve regulates a fuel flow to the engine.

17. A control system according to claim 3, further comprising a cooling air flow metering valve which is controlled by the aggregate valve position demand signal.

18. A control system according to claim 3, wherein the feedback loop includes an inverse static process module which determines steady state driven quantity values as a function of a steady state reference characteristic which is the fluid flow rate.

19. A control system according to claim 17, the valve regulating cooling air flow to a casing of the engine.

* * * * *